2 Sheets--Sheet 1.
C. F. TOLL.
Harvester-Rakes.
No. 155,775.  Patented Oct. 6, 1874.
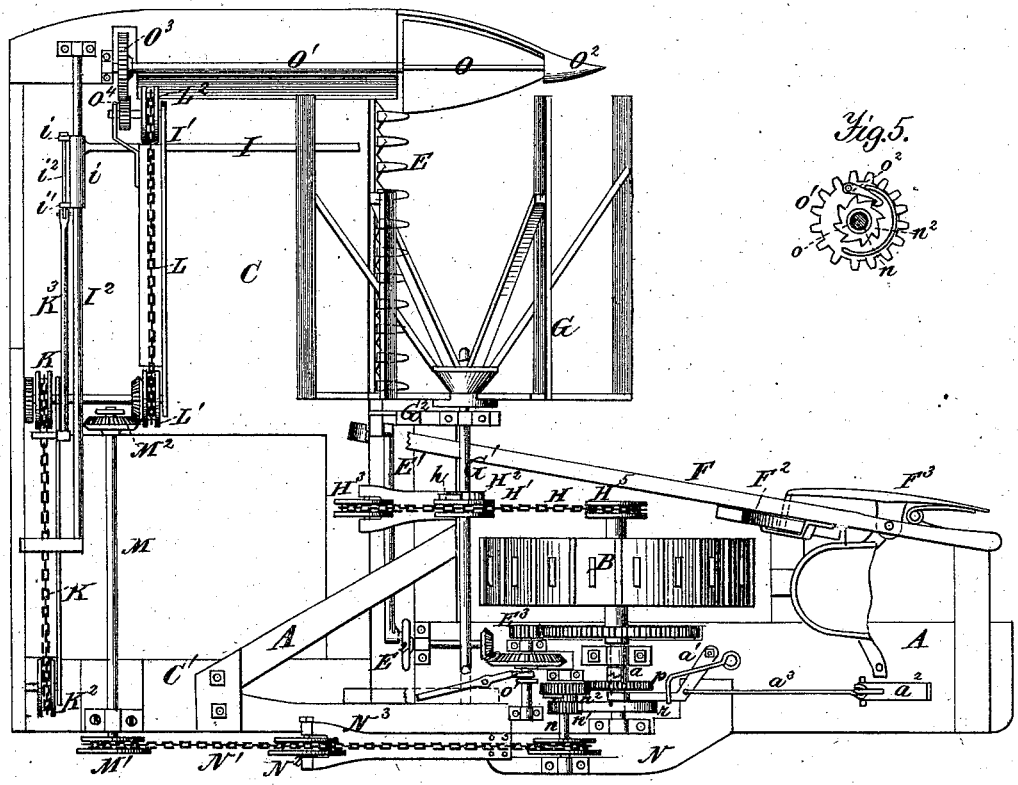
Fig. 1.
Fig. 5.
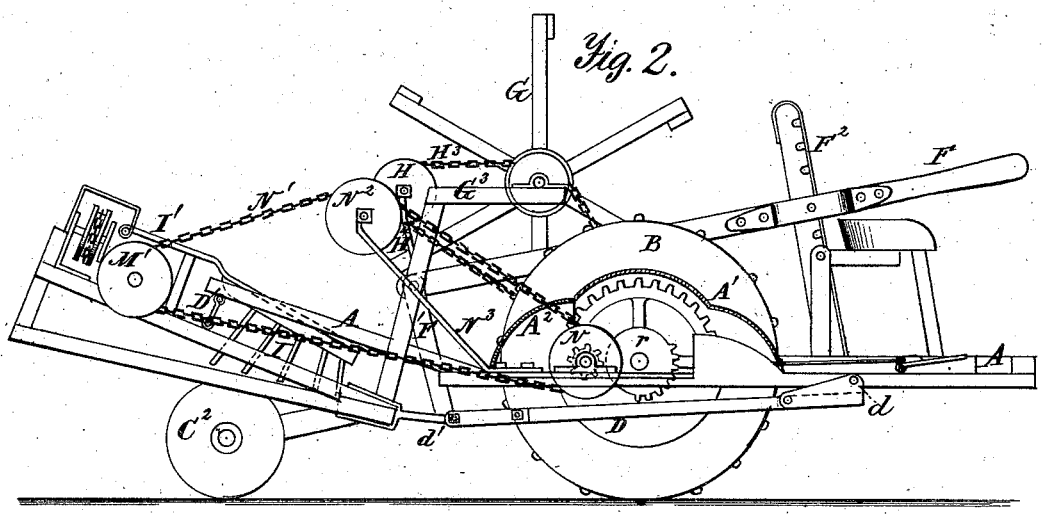
Fig. 2.
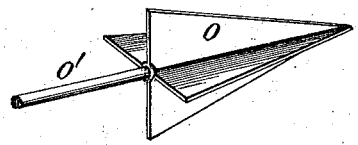
Fig. 6.
Witnesses:
A. Ruppert
Geo. Lupton
Inventor:
C. F. Toll
D. P. Holloway & Co.
Atty

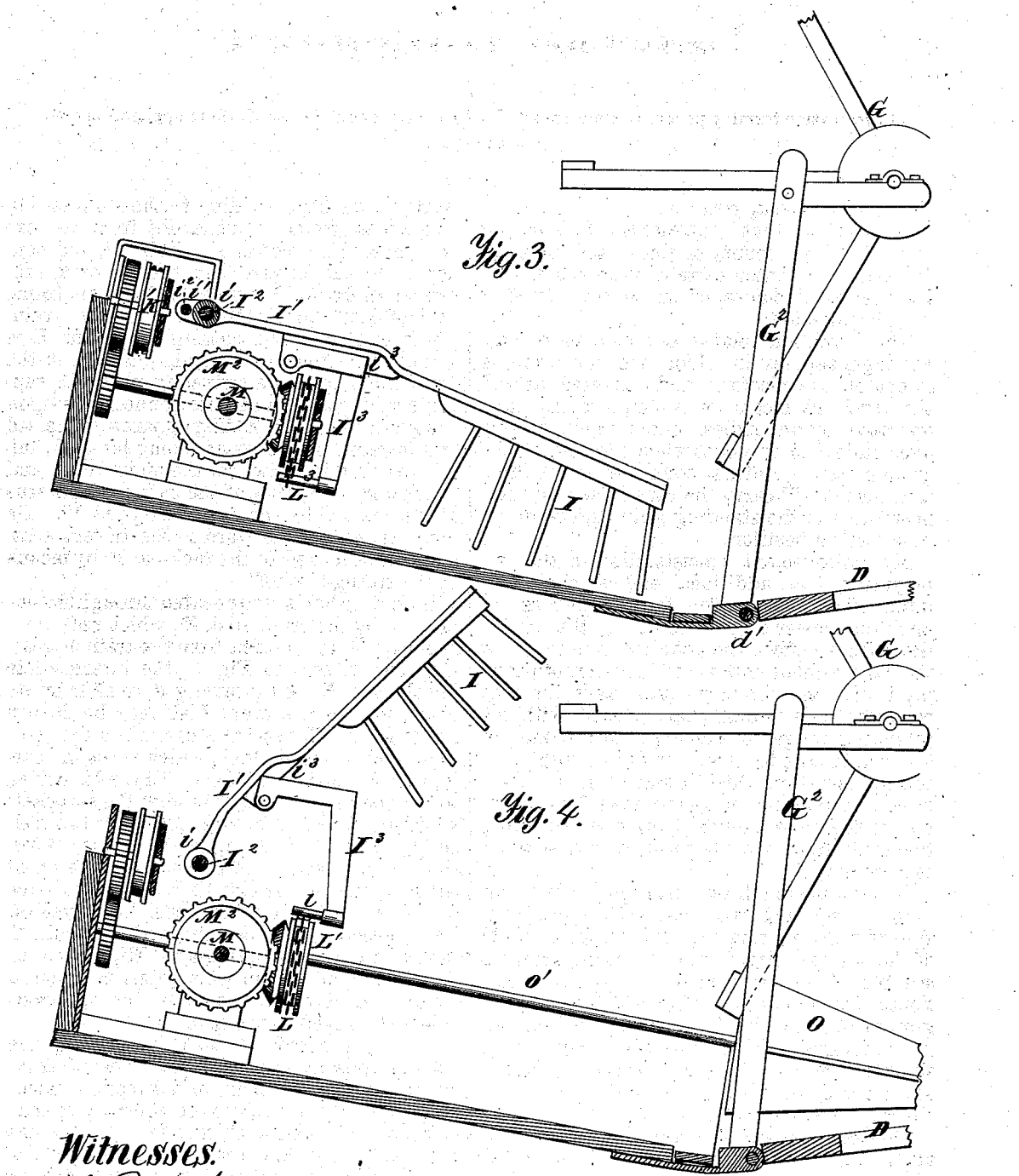

UNITED STATES PATENT OFFICE.

CHRISTIAN F. TOLL, OF DURANT, IOWA.

IMPROVEMENT IN HARVESTER-RAKES.

Specification forming part of Letters Patent No. 155,775, dated October 6, 1874; application filed March 4, 1874.

*To all whom it may concern:*

Be it known that I, CHRISTIAN F. TOLL, of Durant, in the county of Cedar and State of Iowa, have invented certain Improvements in Harvesting-Machines, of which the following is a specification:

This invention relates to that class of harvesting-machines in which the cut grain is swept off the platform and delivered behind the truck by means of a reciprocating rake operated by an endless chain which travels over pulleys or sprocket-wheels in rear of the grain-platform, and is so connected to the rake-arm that it will carry the rake in a horizontal position from the standing grain and return it in a vertical position.

My improvement consists, first, in the employment of an additional endless chain and intermediate mechanism for the purpose of applying power at two points on the arm of the rake, to effect the required movement of the rake without liability or tendency of drawing it into an oblique position, as is the case where but one endless chain is used, with the attending danger of causing the breaking of the arm in case its shank binds too tightly on the guide-rod on which it slides; second, of a novel combination of gear-wheels for imparting to the rake a quick motion in sweeping the grain from the platform, and a slow return motion.

In the annexed drawings, Figure 1 is a plan view of my improved harvesting-machine, showing the gearing exposed by the removal of the casing. Fig. 2 is an elevation, showing stubble-side of the machine. Fig. 3 is a sectional elevation, on a magnified scale, of the grain platform and rake, showing the latter in its horizontal working position. Fig. 4 is a similar view, with the rake elevated. Figs. 5 and 6 are detail views, hereinafter more specifically referred to.

The same letters of reference are used in all the figures in the designation of identical parts.

The main frame A is carried on the axle of the single ground or driving wheel B, the faces of which are, preferably, covered, to prevent the accumulation of dirt, &c., on its spokes. The grain-platform C, with its adjuncts, is provided with a rigid open framework, C′, which, extending to the stubble-side of the main frame, is suspended from the rear end thereof by means of a link, $D^1$, and connected to the forward end thereof by a supplemental frame, D, pivoted to the main frame at $d$, and to the frame-work $C^1$ of the grain-platform at $d^1$. The cutting apparatus E is arranged in front of the grain-platform in the usual manner, and a swiveling-wheel, $C^2$, supports said platform and its connections upon the grain-side. The cutting apparatus is raised and lowered by means of a long lever, F, fulcrumed on a standard on the main frame, and connected to the shoe of the cutting apparatus at the joint $d^1$ by the connecting-rod $F^1$. Its long arm extends forward to the driver's seat, and can be locked to the rack-bar $F^2$ by means of the spring-latch $F^3$.

The cutter-bar is reciprocated through the pitman $E^1$ by the crank-disk $E^2$, which receives a rapid revolving motion from the train of gearing, (clearly seen in Fig. 1,) the intermediate bevel-wheel $E^3$ being arranged to slide on its shaft, so that the crank-disk may be thrown out of gear. The reel G is carried on the overhung end of the shaft $G^1$, which turns in bearings on the posts $G^2$ and $G^3$. The reel is driven by an endless chain, H, through the sprocket-wheel $H^1$, which is placed loosely on the reel-shaft, and when turning in the proper direction—that given to it by the progression of the machine—transmits its motion by means of a pawl, $h$, to a ratchet-wheel, $H^2$, keyed on the reel-shaft. To keep the endless chain H taut at all times, a spring-arm, $H^4$, is used for the support of the sprocket-wheel $H^3$, around which the chain is drawn by the sprocket-wheel $H^5$, keyed to the axle.

It will be perceived that in lowering the cutting apparatus the sprocket-wheel $H^1$ travels on the endless chain in a direction calculated to turn it in a direction contrary to that in which the reel must revolve. By the use of a loose wheel and intermediate means for transmitting its motion to the reel, the former may thus turn without interfering with the proper action of the latter.

The rake I is pivoted by the shank $i$ on the extreme end of its arm $I^1$ on the horizontally-arranged guide-rod $I^2$, located on the rear end of the grain-platform. The shank $i$ of the rake-arm is connected by the pitman K³ to a stud-pin fastened to the endless chain K stretched over sprocket-wheels K¹ and K², located on the rear end of the frame-work C¹. The rake-arm I¹ is also connected by the angular link I³ to the stud-pin $l$ of an endless chain, L, traveling over sprocket-wheels L¹ and L², located upon the rear end of the grain-platform. As the stud-pin $l$ travels along the lower path of the chain L the rake is maintained in a horizontal position, its teeth touching, or nearly touching, the grain-platform; but on said pin rising up on the sprocket-wheel L¹ it lifts the rake through the link I³, and the rake is held in about a vertical position during the travel of the stud-pin along the upper path of the chain. The shank $i$ of the rake-arm and the pitman K³ are connected by a swiveling-pin, $i^2$, turning in ears $i^1$ on the shank, so that the rake can be turned up and down without interfering with the proper action of the pitman K³. The rake-arm I¹ is widened along the part marked $i^3$, and this flat portion enters a fork in the upper side of the horizontal arm of the link I³, as seen in Fig. 3, so as to give a long bearing between the link and the rake-arm when the rake is drawn across the platform to sweep off the grain. Both endless chains K and L travel at the same speed, their respective sprocket-wheels being driven, through suitable intermediate gearing, by the wheel M² on the shaft M, which carries, at its outer end, a sprocket-wheel, M¹, and is driven through it by the endless chain N¹ from the sprocket-wheel N, the chain being kept taut by the sprocket-wheel N² supported on the spring-arm N³.

The rake moves rapidly in sweeping the grain from the platform, and slowly in returning. This is accomplished by the following means: The sprocket-wheel N is fastened to a hollow shaft, $n$, carrying at its other end a fixed gear-wheel, $n^1$, and a ratchet-wheel, $n^2$. The hollow shaft, with its wheels, is mounted loosely on the shaft $o$, which carries the fixed gear-wheel $o^1$, which is provided with a pawl, $o^2$, engaging the teeth of the ratchet-wheel $n^2$. The wheel $o^1$ is driven by the wheel $p$ on the axle, and imparts the slow return movement to the rake by acting through its pawl on the ratchet-wheel $n^2$. The axle is also provided with a segmental wheel, $r$, the teeth of which engage with the wheel $n^1$ the moment the rake is, at the end of its return stroke, turned down into a horizontal position, and imparts to said wheel a motion of, say, double the speed which it receives from the wheel $o^1$, the ratchet-and-pawl arrangement permitting the wheel $n^1$ to gain on the wheel $o^1$. When the rake has swept a gavel from the platform the segmental wheel $r$ becomes disengaged from the wheel $n^1$, and the latter is again driven by the wheel $o^1$ to impart the slow return movement to the rake. The wheels $p$ and $r$ are loose on the axle, and connected together, and can be thrown in and out of gear with a fixed clutch, $a$, on the axle by means of a shifter, $a^1$, operated by a foot-lever, $a^2$, through a connecting-rod, $a^3$. The gear-wheels are covered by hinged caps A¹ and A² to prevent them from becoming clogged by dust, &c.

The divider O (best illustrated in Fig. 6) has the ordinary four-winged spear-shaped form; but, instead of being fixed, is made to revolve. To this end it is fixed to a horizontal shaft, O¹, one end of which has its bearing in the point O², while the other end, turning in a suitable bearing on the rear end of the side board of the grain-platform, carries a gear-wheel, O³, which is driven by a pinion, O⁴, on the axle of the sprocket-wheel L².

What I claim as my invention, and desire to secure by Letters Patent, is—

1. The combination of the endless chain L, link I³, rake I $i^3$, guide-rod I², swiveling-pin $i^2$, pitman K³, and endless chain K, substantially as and for the purpose specified.

2. The wheels $p$ and $r$, in combination with the wheels $n^1$ and $o^1$, pawl $o^2$, and ratchet $n^2$, for driving, through intermediate gearing, the endless chains K and L, and operating to give a varying speed to the rake, substantially in the manner and for the purpose specified.

In testimony whereof, I have signed my name to this specification in the presence of two subscribing witnesses.

CHRISTIAN F. TOLL.

Witnesses:
   D. P. HOLLOWAY,
   B. EDW. J. EILS.